(12) United States Patent
Arimoto

(10) Patent No.: US 10,745,302 B2
(45) Date of Patent: Aug. 18, 2020

(54) METHOD FOR TREATING WATER THAT CIRCULATES THROUGH WET PAINT BOOTH

(71) Applicant: KURITA WATER INDUSTRIES LTD., Tokyo (JP)

(72) Inventor: Yuta Arimoto, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 16/087,785

(22) PCT Filed: Mar. 24, 2017

(86) PCT No.: PCT/JP2017/012039
§ 371 (c)(1),
(2) Date: Sep. 24, 2018

(87) PCT Pub. No.: WO2017/170234
PCT Pub. Date: Oct. 5, 2017

(65) Prior Publication Data
US 2019/0119132 A1 Apr. 25, 2019

(30) Foreign Application Priority Data
Mar. 31, 2016 (JP) .................................. 2016-071912

(51) Int. Cl.
*C02F 1/52* (2006.01)
*B05B 14/462* (2018.01)
(Continued)

(52) U.S. Cl.
CPC ............ *C02F 1/5245* (2013.01); *B01D 21/01* (2013.01); *B05B 14/41* (2018.02); *B05B 14/462* (2018.02);
(Continued)

(58) Field of Classification Search
None
See application file for complete search history.

(56) References Cited

U.S. PATENT DOCUMENTS

| 5,167,830 A | 12/1992 | Ficker |
| 5,240,509 A * | 8/1993 | Rey .................. C02F 1/5236 134/38 |

(Continued)

FOREIGN PATENT DOCUMENTS

| CN | 1257046 A | 6/2000 |
| CN | 1830829 A | 9/2006 |

(Continued)

OTHER PUBLICATIONS

PCT/ISA/210, "International Search Report for International Application No. PCT/JP2017/012039," dated Jun. 20, 2017.

(Continued)

*Primary Examiner* — Clare M Perrin
(74) *Attorney, Agent, or Firm* — Manabu Kanesaka

(57) ABSTRACT

To efficiently perform an adhesion reduction treatment of water that circulates through a wet paint booth which contains a solvent-based paint by adding a relatively small amount of chemical to the water without the need for another chemical except that the alkaline chemical is used for pH adjustment, that is, with only one chemical. An aluminum salt having a basicity of 60% or more and an alkaline chemical are added to water that circulates through a wet paint booth which contains a solvent-based paint. An adhesion reduction treatment of the solvent-based paint is performed at a pH of 7 or more and is preferably performed at a pH of 7.5 or more. Using a powder mixture produced by mixing a powder of the aluminum salt with a powder of the alkaline chemical facilitates the treatment.

5 Claims, 1 Drawing Sheet

(51) Int. Cl.
*C09D 7/00* (2018.01)
*B01D 21/01* (2006.01)
*B05B 14/41* (2018.01)
*C02F 1/66* (2006.01)
C02F 103/14 (2006.01)
B05B 16/40 (2018.01)
B01D 21/30 (2006.01)
C02F 1/00 (2006.01)

(52) U.S. Cl.
CPC .................. *C02F 1/52* (2013.01); *C02F 1/66* (2013.01); *C09D 7/71* (2018.01); *C02F 2103/14* (2013.01); *C02F 2209/06* (2013.01)

(56) References Cited

U.S. PATENT DOCUMENTS

| | | | | |
|---|---|---|---|---|
| 5,248,721 | A | * | 9/1993 | Dixit .......................... C08J 5/24 |
| | | | | 524/494 |
| 5,348,721 | A | * | 9/1994 | Murphy .................. C01F 7/002 |
| | | | | 423/463 |
| 5,562,833 | A | | 10/1996 | Agree et al. |
| 5,614,103 | A | | 3/1997 | Agree et al. |
| 2004/0084373 | A1 | * | 5/2004 | Wilson .................. C02F 1/5245 |
| | | | | 210/651 |

FOREIGN PATENT DOCUMENTS

| | | | | |
|---|---|---|---|---|
| CN | 101205094 | | 6/2008 | |
| EP | 1981807 | A2 * | 10/2008 | ............... A61K 8/26 |
| JP | S52-71538 | A | 6/1977 | |
| JP | H05-228477 | A | 9/1993 | |
| JP | 2000-264627 | A | 9/2000 | |
| JP | 4069799 | B2 | 4/2008 | |
| JP | 4104773 | B2 | 6/2008 | |
| JP | 2014-155916 | A | 8/2014 | |
| JP | 2015-221404 | A | 12/2015 | |
| WO | 2016/035743 | A1 | 3/2016 | |

OTHER PUBLICATIONS

China Patent Office, "Office Action for Chinese Patent Publication No. 201780017978.0," dated Feb. 22, 2019.
Europe Patent Office, "Search Report for European Patent Publication No. 17774771.4," dated Sep. 19, 2019.

* cited by examiner

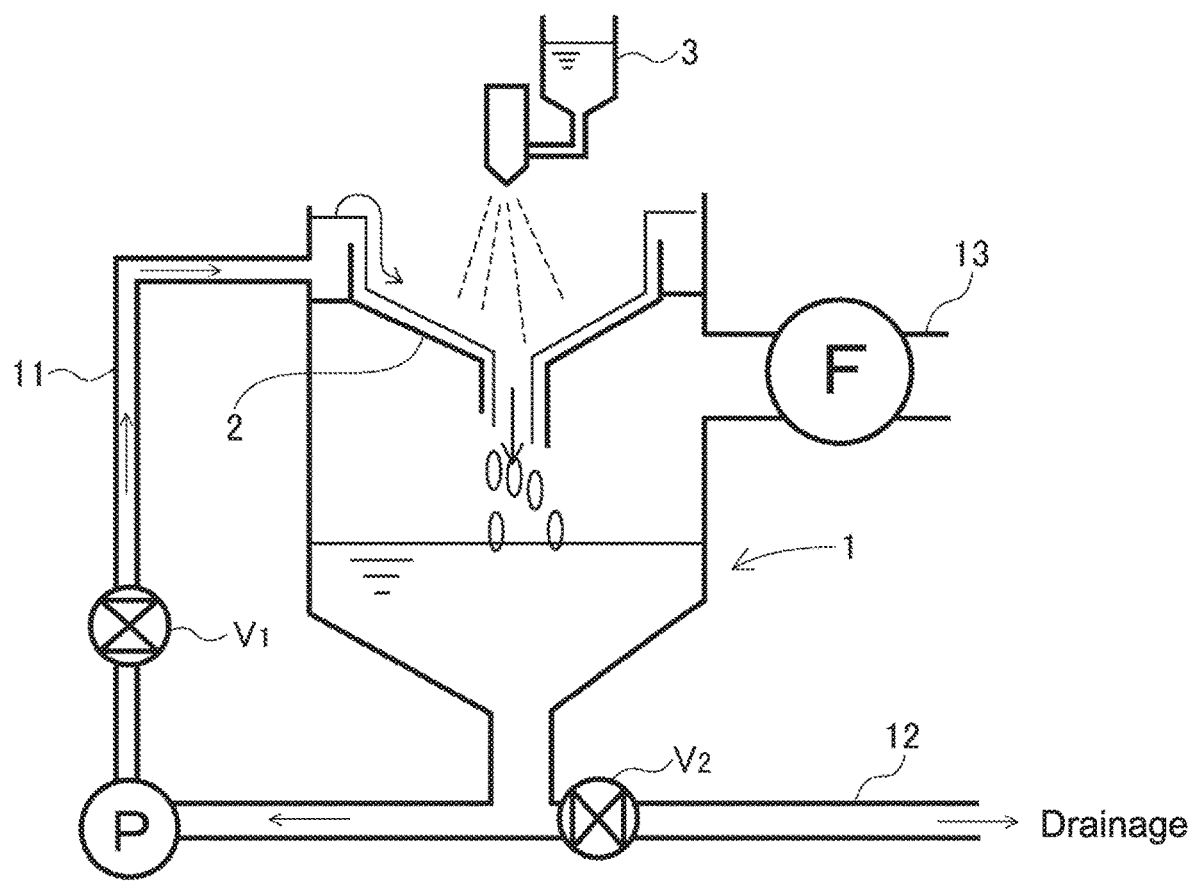

METHOD FOR TREATING WATER THAT CIRCULATES THROUGH WET PAINT BOOTH

RELATED APPLICATIONS

The present application is National Phase of International Application No. PCT/JP2017/012039 filed Mar. 24, 2017, and claims priority from Japanese Application No. 2016-071912, filed Mar. 31, 2016, the disclosure of which is hereby incorporated by reference herein in its entirety.

TECHNICAL FIELD

The present invention relates to an agent for treating water that circulates through a wet paint booth which contains a solvent-based paint and a method for treating the water that circulates through a wet paint booth that are used for reducing adhesion of paint contained in the water that circulates through a wet paint booth.

BACKGROUND ART

Spray painting has been performed in a process of painting automobiles, electrical apparatuses, metal products, and the like. Spray painting produces a large amount of over-spray paint (excess paint), which is not deposited on the item that is to be painted. An amount of excess paint produced in such a painting process is about 50% to 60% of the amount of the paint used, excluding the case where electrostatic painting, which offers a high painting efficiency, is used. Accordingly, it is necessary to remove and collect excess paint from the environment of the painting process. Wet paint booths, in which water is used for cleaning, have been commonly used for collecting excess paint. The cleaning water is circulated and reused. In such a painting booth, excess paint contained in the circulation water is coagulated and separated in order to prevent the accumulation of paint that remains in the circulation water.

Paints are broadly divided into solvent-based paints that include only an organic solvent, such as a thinner, as a solvent and water-based paints that include water as a solvent. Solvent-based paints have higher weather resistance and higher chipping resistance than water-based paints and have been widely used particularly for automotive top clear coating. In the case where a solvent-based paint is used, the particles of excess paint mixed in the circulation water, which have high adhesion, are likely to adhere to and severely contaminate the facilities and may also coagulate with one another to form large flocs, which cause clogging.

Accordingly, it is important for coagulating water that circulates through a wet paint booth which contains a solvent-based paint to reduce the adhesion of the solvent-based paint.

It is publicly known that an aluminum inorganic coagulant can be used for treating water that circulates through a wet paint booth. PTL 1 proposes a technique in which a mixture of a copolymer of tannine and a cationic monomer with polyaluminum chloride is used for treating water that circulates through a wet paint booth which contains a water-based paint and a solvent-based paint. PTL 2 proposes a technique in which an inorganic coagulant is used in combination with a polymer coagulant aid for treating a water-based paint.

There have been cases where a clay mineral, a phenol resin, tannine, and the like are used as an agent for reducing the adhesion of solvent-based paints. However, the above agents need to be used in combination with a cationic chemical for performing the adhesion reduction treatment. PTL 3 proposes a method in which a phenol resin and a cationic polymer, such as an alkylamine-epichlorohydrin condensate, are added to water that circulates through a wet paint booth in a predetermined ratio.

While anionic chemicals, such as a phenol resin, have been known as an agent for reducing the adhesion of solvent-based paints as described in PTL 3, the use of anionic chemicals require a complex chemical control because they need to be used in combination with a cationic chemical and the amounts of the anionic chemical and the cationic chemical need to be controlled in order to keep the ionic balance in the circulation water.

PTL 1: U.S. Pat. No. 5,614,103
PTL 2: Japanese Patent Publication No. S52-71538
PTL 3: Japanese Patent No. 4069799

SUMMARY OF INVENTION

An object of the present invention is to address issues described above and to provide an agent for treating water that circulates through a wet paint booth which contains a solvent-based paint and a method for treating water that circulates through a wet paint booth that enable an adhesion reduction treatment of the water that circulates through a wet paint booth to be efficiently performed with only one chemical and without the need for the complex chemical control.

The inventors of the present invention conducted extensive studies in order to address the above issues and, as a result, found that a high-basicity aluminum salt having a basicity of 60% or more has a higher capability to reduce the adhesion of a solvent-based paint than polyaluminum chloride (basicity: about 50%), which has been commonly used as an aluminum inorganic coagulant, or aluminum sulfate and that, when the high-basicity aluminum salt is used, the adhesion of a solvent-based paint can be reduced to a sufficient degree without using another chemical in combination with the high-basicity aluminum salt only by adjusting the pH of the water to be 7 or more or preferably to be 7.5 or more with an alkaline chemical.

Specifically, the summary of the present invention is as follows.

[1] An agent for treating water that circulates through a wet paint booth, the water containing a solvent-based paint, the agent comprising an aluminum salt having a basicity of 60% or more.

[2] The agent for treating water that circulates through a wet paint booth according to [1], wherein the aluminum salt is basic aluminum chloride, and wherein a mass ratio Al/Cl of aluminum to chlorine is 1.0 or more.

[3] The agent for treating water that circulates through a wet paint booth according to [1] or [2], the agent comprising the aluminum salt and an alkaline chemical.

[4] The agent for treating water that circulates through a wet paint booth according to [3], the agent including a powder mixture produced by mixing a powder of the aluminum salt with a powder of the alkaline chemical.

[5] The agent for treating water that circulates through a wet paint booth according to [4], wherein the mixing ratio between the powder of the aluminum salt and the powder of the alkaline chemical is adjusted such that the water that circulates through a wet paint booth has a pH of 7 or more after the mixture has been added to the water.

[6] The agent for treating water that circulates through a wet paint booth according to [4] or [5], wherein the powder of the alkaline chemical is a powder of sodium carbonate.

[7] The agent for treating water that circulates through a wet paint booth according to any one of [1] to [6], wherein the aluminum salt is high-basicity aluminum chloride.

[8] A method for treating water that circulates through a wet paint booth, the water containing a solvent-based paint, the method comprising adding an aluminum salt having a basicity of 60% or more to the water that circulates through a wet paint booth and adjusting the pH of the water that circulates through a wet paint booth to be 7 or more.

[9] The method for treating water that circulates through a wet paint booth according to [8], wherein the aluminum salt is basic aluminum chloride, and wherein a mass ratio Al/Cl of aluminum to chlorine is 1.0 or more.

[10] The method for treating water that circulates through a wet paint booth according to [8] or [9], wherein the aluminum salt and an alkaline chemical are added to the water that circulates through a wet paint booth.

[11] The method for treating water that circulates through a wet paint booth according to [10], wherein a powder mixture produced by mixing a powder of the aluminum salt with a powder of the alkaline chemical is added to the water that circulates through a wet paint booth, and wherein the mixing ratio between the powder of the aluminum salt and the powder of the alkaline chemical is adjusted such that the water that circulates through a wet paint booth has a pH of 7 or more after the mixture has been added to the water.

Advantageous Effects of Invention

According to the present invention, an adhesion reduction treatment of water that circulates through a wet paint booth which contains a solvent-based paint can be effectively performed with only one chemical without the need for a complex chemical control.

The chemicals used for performing the adhesion reduction treatment in the present invention are only the aluminum salt having a basicity of 60% or more and the alkaline chemical that is optionally used. In the present invention, it is not necessary to control the addition of an anionic chemical and a cationic chemical such that the two chemicals are used in predetermined proportions as in the related art. Furthermore, the treatment may be performed at a pH of 7 or more and is preferably performed at a pH of 7.5 or more.

BRIEF DESCRIPTION OF DRAWINGS

FIG. 1 is a schematic diagram illustrating a test system used in Examples.

DESCRIPTION OF EMBODIMENTS

An embodiment of the present invention is described below in detail.

[Mechanisms of Action]

In the present invention, an aluminum salt having a basicity of 60% or more is used as a chemical for reducing the adhesion of a solvent-based paint. It is preferable to use basic aluminum chloride. The term "basicity" used herein refers to basicity measured in accordance with JIS K 1475-1996. Basic aluminum chloride is represented by General Formula $[Al_2(OH)_nCl_{6-n}]_m$ (0<n<6, m≤10). The basicity of aluminum chloride can be calculated as (n/6)×100(%). In the case where basic aluminum chloride is used, the mass ratio Al/Cl of aluminum to chlorine is preferably 1 or more and is particularly preferably 1.2 or more. As for the upper limit, the mass ratio Al/Cl of aluminum to chlorine is preferably limited to be 2 or less and is more preferably limited to be 1.9 or less. The amounts of aluminum and chlorine can be measured by, for example, emission spectrochemical analysis and ion chromatography, respectively. An aluminum salt, such as PAC, having a basicity of 60% or more and, in particular, basic aluminum chloride having an Al/Cl ratio of 1 or more have a higher capability of reducing the adhesion of a solvent-based paint than common PAC (basicity: 50%), low-basicity PAC (basicity: 34%), or aluminum sulfate. It is advantageous to use the aluminum salt having a basicity of 60% or more because the Cl content in the aluminum salt is small compared with $Al_2O_3$, which leads to a reduction in the amount of unwanted corrosive ions present in the water. The Al/Cl ratios of common PAC and low-basicity PAC are about 0.4 to 0.8.

The details of the mechanisms of action by which the aluminum salt having a basicity of 60% or more, which is used in the present invention, has a high capability to reduce the adhesion of a solvent-based paint have not been clarified; it is considered that the precipitation and flocculation of an acidic aluminum salt which are caused due to an increase in pH result in the formation of a large amount of $Al(OH)_3$ flocs originating from the high-basicity aluminum salt when the pH of the water is 7.5 or more and the $Al(OH)_3$ flocs play a role in the adhesion reduction treatment in an effective manner.

It is considered that the reason for which the adhesion reduction effect of an aluminum salt varies with the basicity of the aluminum salt is that the diameter of flocs precipitated varies with the basicity. For example, in the case where PAC having a basicity of 50% is used, flocs having an average size of about 10 μm are precipitated at a pH of 7.0. On the other hand, in the case where an aluminum salt having a basicity of 60% is used, fine flocs having an average size of 2 μm are formed at a pH of 7.0. The fine flocs are considered to reduce the adhesion of a solvent-based paint in a more effective manner.

[Aluminum Salt]

The aluminum salt used in the present invention is a highly basic aluminum salt that has a basicity of 60% or more (hereinafter, referred to as "high-basicity aluminum salt"). In particular, a basic aluminum chloride having a basicity of 60% or more (hereinafter, referred to as "high-basicity aluminum chloride") is suitably used. In the case where the high-basicity aluminum chloride is used, the mass ratio Al/Cl of aluminum to chlorine is preferably 1 or more and is particularly preferably 1.2 or more. As for the upper limit, it is preferable to limit the mass ratio Al/Cl of aluminum to chlorine to be 2 or less. It is more preferable to limit the ratio Al/Cl to be 1.9 or less. Two or more aluminum salts having different degrees of basicity may be used in combination or in a mixture.

[Alkaline Chemical]

In the present invention, an alkaline chemical may optionally be used in combination with the high-basicity aluminum salt in order to adjust the pH of the water that circulates through a wet paint booth to be 7 or more and preferably to be 7.5 or more. If the pH of water that circulates through a wet paint booth is less than 7, the adhesion of a solvent-based paint may fail to be reduced to a sufficient degree by using the high-basicity aluminum salt.

Examples of the alkaline chemical include sodium hydroxide (caustic soda), potassium hydroxide, calcium hydroxide (slaked lime), and sodium carbonate. The above alkaline chemicals may be used alone or in combination of two or more.

Among the above alkaline chemicals, slaked lime and sodium carbonate provided in a powder form are easy to handle because they can be mixed with a powder of the high-basicity aluminum salt and the resulting powder mixture can be used as a single agent, as described below.

[Amount of Chemical Added]

The amount of the high-basicity aluminum salt added to water that circulates through a wet paint booth is determined adequately in accordance with the concentration of a solvent-based paint in the water that circulates through a wet paint booth and the adhesion of the solvent-based paint such that a sufficient adhesion reduction effect is achieved. If the amount of the high-basicity aluminum salt added to the water is excessively small, a sufficiently large adhesion reduction effect may fail to be achieved. On the other hand, adding an excessively large amount of high-basicity aluminum salt to the water does not increase the adhesion reduction effect to a degree appropriate to the amount of the high-basicity aluminum salt added to the water and results in, for example, increases in chemical coats and the amount of coagulated sludge. In general, the amount of the high-basicity aluminum salt added to water that circulates through a wet paint booth is preferably about 5 to 60 mg/L as $Al_2O_3$. It is preferable to add the high-basicity aluminum salt to water that circulates through a wet paint booth such that the $Al_2O_3$-equivalent amount of the high-basicity aluminum salt is about 0.5% to 5% by weight of the amount of solid component of the solvent-based paint contained in the water.

The alkaline chemical is optionally added to water that circulates through a wet paint booth such that the pH of the water is adjusted to be 7 or more, is preferably adjusted to be 7.2 or more, and is more preferably adjusted to be 7.5 or more. While the pH range in which coagulation is performed using an aluminum salt in common water treatment is about 6 to 7, the pH of the water is adjusted to be 7 or more, is preferably adjusted to be 7.2 or more, and is more preferably adjusted to be 7.5 or more in the present invention, where the high-basicity aluminum salt is used not for performing coagulation but for reducing the adhesion of the solvent-based paint with the precipitated aluminum flocs. There is no specific upper limit for the pH of the water from the viewpoint of achieving the adhesion reduction effect; the pH of the water is normally set to 8.5 or less from the aspect of chemical costs and the alkali resistance of the apparatus.

[Addition Mode and Addition Position]

The mode in which the high-basicity aluminum salt and the alkaline chemical are added to the water is not limited; these chemicals may be added to the water individually or may be mixed with each other to form a single agent, which is added to the water.

The position at which the chemicals are added to the water is not limited; the chemicals may be added to the water circulating through a wet paint booth or to a tank that contains the circulation water. It is preferable to add the chemicals to a circulation line in order to use the chemicals at high concentrations for treating the excess paint. In the case where the high-basicity aluminum salt and the alkaline chemical are added to the water individually, it is preferable to add the chemicals to the water at the same injection point or at adjacent injection points.

Regardless of whether the high-basicity aluminum salt and the alkaline chemical are used individually as two agents or mixed with each other and used as a single agent, the chemicals may be used in a powder form or may be dissolved in water and used in a liquid form. In particular, in the case where the high-basicity aluminum salt and the alkaline chemical are mixed with each other and used as a single agent, a powder of the high-basicity aluminum salt and a powder of the alkaline chemical may be mixed with each other and the resulting powder mixture may be added to the water. In other words, the agent for treating water that circulates through a wet paint booth according to the present invention may be a powder mixture produced by mixing a powder of the high-basicity aluminum salt with a powder of the alkaline chemical. In such a case, the mixing ratio between the aluminum salt powder and the alkaline chemical powder may be adjusted such that the water that circulates through a wet paint booth has a pH of 7 or more, preferably has a pH of 7.2 or more, and more preferably has a pH of 7.5 or more after the above chemicals have been added to the water in order to reduce the adhesion of the solvent-based paint with good workability using one powder chemical.

The mixing ratio between the powder of the high-basicity aluminum salt and the powder of the alkaline chemical, which constitute the powder mixture, is determined adequately in accordance with the qualities of water that circulates through a wet paint booth, which is the water to be treated. In the case where sodium carbonate is used as an alkaline chemical, the mixing ratio between the high-basicity aluminum salt and sodium carbonate is determined adequately so as to fall within the range of 1:0.1 to 1 by weight.

The above powder mixture may optionally include an inorganic material such as clay mineral or calcium carbonate in order to prevent, for example, moisture absorption and blocking of powder particles.

According to the present invention, the adhesion reduction treatment can be efficiently performed by adding only the high-basicity aluminum salt and the alkaline chemical, which is used for pH adjustment, to the water without the need for adjusting the ionicity of the water. The aluminum flocs that include the solvent-based paint that has been subjected to the adhesion reduction treatment according to the present invention come to the water surface of a circulation water tank and can be collected by humans or by using a publicly known sludge collection apparatus that includes a pump provided with a float and capable of drawing the water surface by suction. The collected aluminum flocs may be discharged to the outside of the system.

EXAMPLES

The present invention is described more specifically with reference to Examples below.

[Chemicals Used]

The following chemicals were used for the treatments in Examples and Comparative examples. The term "basicity" used herein refers to the basicity measured by the method defined in JIS K 1475-1996. The $Al_2O_3$-equivalent concentration and Cl ion concentration were measured by emission spectrochemical analysis and ion chromatography, respectively. The mass ratio Al/Cl of aluminum to chlorine was calculated on the basis of the $Al_2O_3$-equivalent concentration and the Cl ion concentration.

Chemical 1: aqueous PAC solution (PAC "Taipac 6010" produced by TAIMEI CHEMICALS CO., LTD., basicity: 50.0%, $Al_2O_3$-equivalent concentration: 10 weight %, Cl ion concentration: 8.2 weight %, Al/Cl mass ratio: 0.6, specific gravity: 1.2)

Chemical 2: aqueous solution of high-basicity aluminum chloride (basicity: 62.7%, $Al_2O_3$-equivalent concentration: 23 weight %, Cl ion concentration: 7.6 weight %, Al/Cl mass ratio: 1.6, specific gravity: 1.3)

Chemical 3: aqueous alkaline solution of phenol resin (liquid mixture of 20 weight % phenol resin "Resitop 4324"

produced by Gun Ei Chemical Industry Co., Ltd, 10 weight % 48%-caustic soda, and 70 weight % pure water, specific gravity: 1.1)

Chemical 4: mixture of a powder of high-basicity aluminum chloride (basicity: 62.7%, $Al_2O_3$-equivalent content: 46 weight %, Cl ion concentration: 15.2 weight % (equivalent concentration), Al/Cl mass ratio: 1.6) and a sodium carbonate powder (the amount of sodium carbonate was adjusted such that the pH of water in which the chemical had been dissolved satisfied the test conditions)

Chemical 5: aqueous solution of an alkylamine-epichlorohydrin condensate (concentration of alkylamine-epichlorohydrin condensate: 50 weight %, specific gravity: 1.15)

Chemical 6: aqueous PAC solution (PAC "W-PAC" produced by Toshin Chemical Industry Co., Ltd., basicity: about 33.6%, $Al_2O_3$-equivalent concentration: 10 weight %, Cl ion concentration: 11.5 weight %, Al/Cl mass ratio: 0.5, specific gravity: 1.2)

Chemical 7: aqueous aluminum sulfate solution ($Al_2O_3$-equivalent concentration: 8 weight %, specific gravity: 1.3)

[Paint Sample]

A solvent-based automotive clear paint was used as a paint sample.

[Test Method]

The following test method was used.

The test system illustrated in FIG. 1 was used for the test. In this test system, the circulation water stored in a circulation water tank 1 is circulated with a pump P at 100 L/minute and flows downward along a water-screen plate 2 disposed above the circulation water tank, on which a paint is sprayed. In FIG. 1, Reference Numeral 3 denotes a paint-spraying apparatus, Reference Numeral 11 denotes a circulation pipe, Reference Numeral 12 denotes a drain pipe through which the circulation water is discharged to the outside of the system, Reference Numeral 13 denotes an exhaust pipe, $V_1$ and $V_2$ denote a valve, and F denotes an exhaust fan.

The following chemicals were added to water that circulated through a wet paint booth at predetermined concentrations. The pH of the water was adjusted to be the predetermined pH with sulfuric acid or caustic soda. Subsequently, the system was actuated (note that, in Example 2, only the chemical 4 was used for pH adjustment). The paint sample was sprayed at a rate of 10 g/minute for 2 minutes. Then, the system was paused.

Immediately after the system had been paused, the adhesion of the sludge that came to the water surface of the circulation water tank (immediate adhesion reduction) was inspected with fingers and evaluated in accordance with the following criteria.

Portion of the sludge was charged into a container and left to stand for 24 hours. Subsequently, the adhesion of the sludge (after-dry adhesion reduction) was inspected with fingers and evaluated also in accordance with the following criteria.

<Evaluation Criteria>

⊙: No adhesion

○: No adhesion, but easily solidified when kneaded with fingers

Δ: Slight adhesion x: High adhesion

Comparative Example 1

No chemical was used

Comparative Example 2

6.3 mL of the chemical 1 ($Al_2O_3$-equivalent concentration: 15 mg/L) was used

Comparative Example 3

3.4 mL (net content of resin: 15 mg/L) or 5.1 ml (net content of resin: 22.5 mg/L) of the chemical 3 was used in combination with 0.2 g of the chemical 5

Comparative Example 4

6.3 mL of the chemical 6 ($Al_2O_3$-equivalent concentration: 15 mg/L) was used

Comparative Example 5

7.2 mL of the chemical 7 ($Al_2O_3$-equivalent concentration: 15 mg/L) was used

Example 1

2.5 mL of the chemical 2 ($Al_2O_3$-equivalent concentration: 15 mg/L) was used

Example 2 the chemical 4 in which the mixing ratio (g) between a powder of the high-basicity aluminum chloride and a powder of sodium carbonate was set to 1.63/0, 1.63/0.13, or 1.63/0.49 (in any case, the $Al_2O_3$-equivalent concentration was 15 mg/L) was used.

Tables 1 to 7 summarize the results obtained in Comparative examples 1 to 5 and Examples 1 and 2, respectively.

TABLE 1

| Comparative example 1 (No chemical was used) | | | | |
|---|---|---|---|---|
| Amount of chemical added (mL) | $Al_2O_3$ concentration (mg/L) | pH | Immediate adhesion reduction | After-dry adhesion reduction |
| 0 | 0 | 6.5 | X | X |
| 0 | 0 | 7.0 | X | X |
| 0 | 0 | 7.5 | X | X |
| 0 | 0 | 8.0 | X | X |

TABLE 2

| Comparative example 2 (chemical 1 was used) | | | | |
|---|---|---|---|---|
| Amount of chemical 1 (mL) | $Al_2O_3$ concentration (mg/L) | pH | Immediate adhesion reduction | After-dry adhesion reduction |
| 6.3 | 15 | 5.99 | X | X |
| 6.3 | 15 | 6.53 | X | X |
| 6.3 | 15 | 6.94 | X | X |
| 6.3 | 15 | 7.97 | X | X |

TABLE 3

Comparative example 3 (chemical 3 + chemical 5 were used)

| Amount of chemical 3 added (mL) | Amount of chemical 5 added (g) | Net content of resin (mg/L) | pH | Immediate adhesion reduction | After-dry adhesion reduction |
|---|---|---|---|---|---|
| 3.4 | 0.2 | 15 | 6.49 | Δ | X |
| 3.4 | 0.2 | 15 | 7.06 | ○ | Δ |
| 3.4 | 0.2 | 15 | 7.56 | ○ | Δ |
| 3.4 | 0.2 | 15 | 8.01 | ⊚ | Δ |
| 5.1 | 0.2 | 22.5 | 6.51 | ○ | Δ |
| 5.1 | 0.2 | 22.5 | 7.02 | ○ | ○ |
| 5.1 | 0.2 | 22.5 | 7.51 | ⊚ | ⊚ |
| 5.1 | 0.2 | 22.5 | 8.02 | ⊚ | ⊚ |

TABLE 4

Comparative example 4 (chemical 6 was used)

| Amount of chemical 6 added (mL) | $Al_2O_3$ concentration (mg/L) | pH | Immediate adhesion reduction | After-dry adhesion reduction |
|---|---|---|---|---|
| 6.3 | 15 | 6.51 | ○ | Δ |
| 6.3 | 15 | 7.00 | X | X |
| 6.3 | 15 | 7.45 | X | X |
| 6.3 | 15 | 8.09 | X | X |

TABLE 5

Comparative example 5 (chemical 7 was used)

| Amount of chemical 7 added (mL) | $Al_2O_3$ concentration (mg/L) | pH | Immediate adhesion reduction | After-dry adhesion reduction |
|---|---|---|---|---|
| 7.2 | 15 | 6.57 | Δ | Δ |
| 7.2 | 15 | 7.04 | X | X |
| 7.2 | 15 | 7.44 | X | X |
| 7.2 | 15 | 7.98 | X | X |

TABLE 6

Example 1 (chemical 2 was used)

| Amount of chemical 2 added (mL) | $Al_2O_3$ concentration (mg/L) | pH | Immediate adhesion reduction | After-dry adhesion reduction |
|---|---|---|---|---|
| 2.5 | 15 | 6.04 | ○ | Δ |
| 2.5 | 15 | 6.50 | ○ | ○ |
| 2.5 | 15 | 7.01 | ⊚ | ○ |
| 2.5 | 15 | 7.46 | ⊚ | ⊚ |
| 2.5 | 15 | 8.01 | ⊚ | ⊚ |

TABLE 7

Example 2 (chemical 4 was used)

| Amount of chemical 4 added (g) (high-basicity Al/ /$Na_2CO_3$) | $Al_2O_3$ concentration (mg/L) | pH | Immediate adhesion reduction | After-dry adhesion reduction |
|---|---|---|---|---|
| 1.63/0 | 15 | 7.29 | ⊚ | ⊚ |
| 1.63/0.13 | 15 | 7.50 | ⊚ | ⊚ |
| 1.63/0.49 | 15 | 8.0 | ⊚ | ⊚ |

[Discussions]

The above test results show the following facts.

The results of the tests conducted at the same $Al_2O_3$-equivalent concentration and substantially the same pH confirm that only the aluminum chloride salts having a high basicity had the adhesion reduction effect. In particular, when the pH of the water was set to 7.0 or more and when the pH of the water was set to 7.5 or more in order to enhance the adhesion reduction effect, the adhesion reduction effect was effectively achieved (Tables 2 and 4 to 7).

The high-basicity aluminum chloride had a high adhesion reduction effect although the amount of the high-basicity aluminum chloride used was smaller than the amount of the resin (chemical 3+chemical 5) of the related art which is shown in Table 3 in terms of the net amount of chemical used.

A comparison of immediate adhesion reduction at a pH of 7.0 confirms that the high-basicity aluminum chloride achieved a larger immediate adhesion reduction and was less susceptible to pH than chemicals used in the related art.

In the case where the chemical 4 that is a powder mixture is used, the content of sodium carbonate can be increased by changing the mixing ratio between the high-basicity aluminum chloride and sodium carbonate in consideration of, for example, a reduction in pH due to the decomposition of the circulation water.

Although the present invention has been described in detail with reference to particular embodiments, it is apparent to a person skilled in the art that various modifications can be made therein without departing from the spirit and scope of the present invention.

The present application is based on Japanese Patent Application No. 2016-071912 filed on Mar. 31, 2016, which is incorporated herein by reference in its entirety.

The invention claimed is:

1. A method for treating water that circulates through a wet paint booth, the water containing a solvent-based paint, the method comprising:
   adding additives consisting of an aluminum salt and an alkaline chemical to the water that circulates through the wet paint booth, to adjust a pH of the water that circulates through the wet paint booth to be 7 or more, the aluminum salt containing basic aluminum chloride and having a basicity of 60% or more and a mass ratio Al/Cl of aluminum to chlorine being 1.0 or more, and
   allowing for precipitation and flocculation of the aluminum salt, thereby reducing adhesiveness of the solvent-based paint.

2. The method for treating water that circulates through a wet paint booth according to claim 1, wherein the aluminum salt is a basic aluminum chloride.

3. The method for treating water that circulates through a wet paint booth according to Claim 1, wherein a powder mixture produced by mixing a powder of the aluminum salt with a powder of the alkaline chemical is added to the water that circulates through the wet paint booth, and wherein a mixing ratio between the powder of the aluminum salt and the powder of the alkaline chemical is adjusted such that the water that circulates through the wet paint booth has a pH of 7 or more after the mixture has been added to the water.

4. A method for treating water that circulates through a wet paint booth according to claim 1, wherein the mass ratio Al/Cl of aluminum to chlorine is 2.0 or less.

5. A method for treating water that circulates through a wet paint booth according to claim 4, wherein the aluminum salt forms flocs having an average size of 2 μm.

* * * * *